Nov. 3, 1959  F. A. WOHLER  2,910,912
BINOCULAR TELESCOPE WITH BUILT-IN RANGEFINDER
Filed June 26, 1956  3 Sheets-Sheet 1
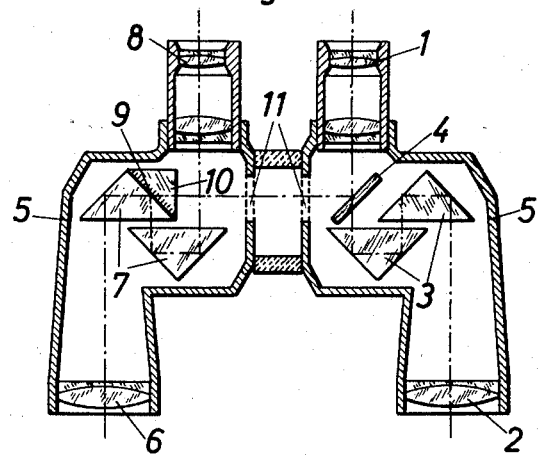
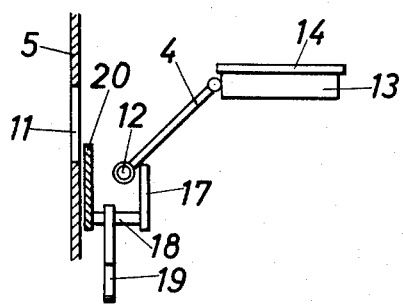
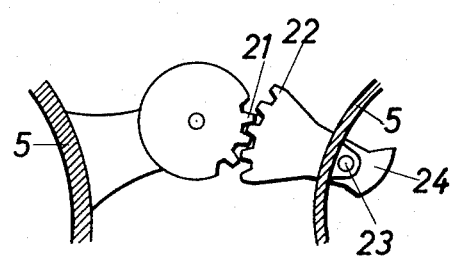
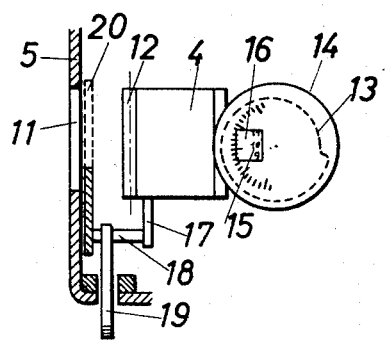

Nov. 3, 1959          F. A. WOHLER          2,910,912
BINOCULAR TELESCOPE WITH BUILT-IN RANGEFINDER
Filed June 26, 1956          3 Sheets-Sheet 2
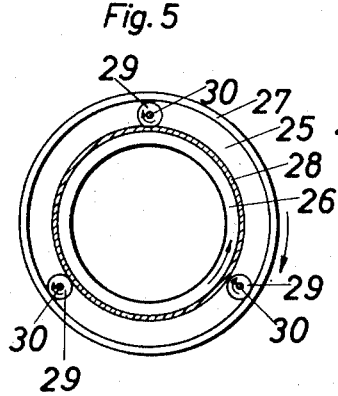
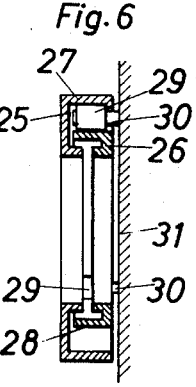
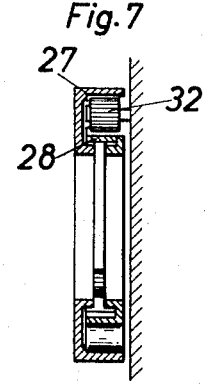
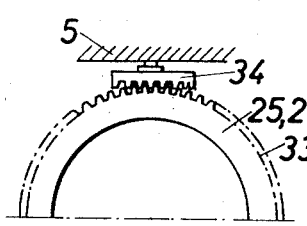
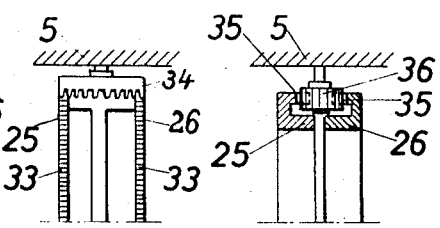
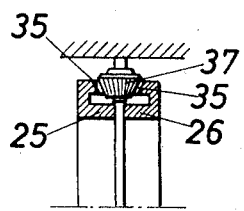
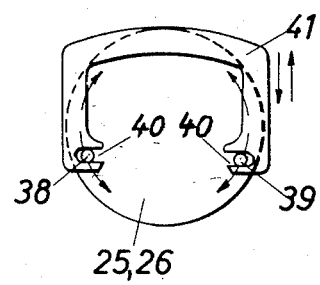

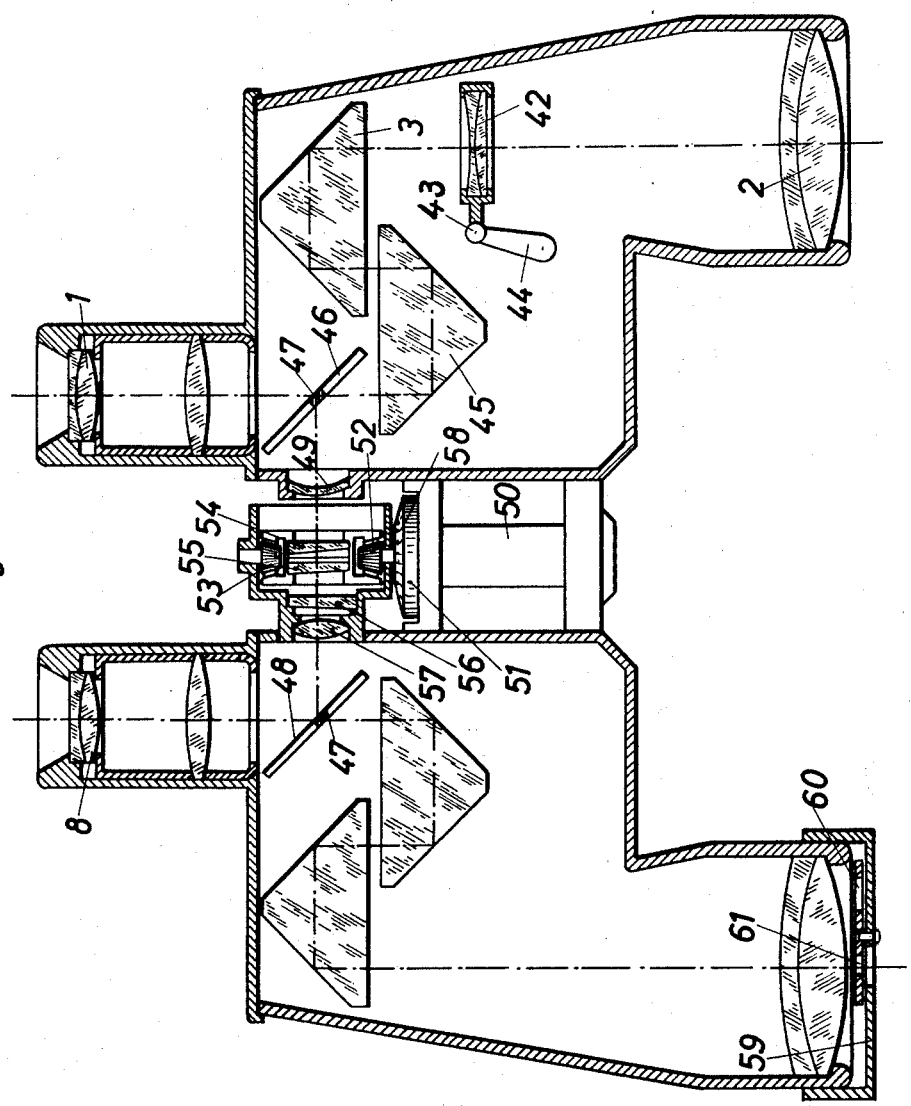

United States Patent Office 2,910,912
Patented Nov. 3, 1959

2,910,912
BINOCULAR TELESCOPE WITH BUILT-IN RANGEFINDER

Friedrich A. Wohler, Saarbrucken, Saarland

Application June 26, 1956, Serial No. 594,046

Claims priority, application Germany July 1, 1955

8 Claims. (Cl. 88—34)

This invention relates to certain improvements in binocular telescopes.

It is an object of the invention to provide means, on a telescope of the type referred to, for automatically determining and directly reading the distance of the telescope from an object immediately after the focussing of the telescope.

With this and further objects in view according to the present invention the telescope is provided with a base range finder whose base is defined by the distance between the two optical systems.

According to a preferred embodiment of the invention the base range finder comprises a semitransparent or partly permeable mirror which is rotatable or swingable in the path of rays of one of the eyepieces or oculars of a telescope and opposed to a reflecting prism in the course of the rays of the other ocular in such a way that each position of the mirror corresponds to a definite distance.

Advantageously, the casing of the telescope is formed in the course of the rays from the reflection prism of one of the oculars to the partly transparent mirror of the measuring ocular with apertures which may be closable.

Moreover, it is advantageous to provide on the setting member of the mirror a scale for the direct indication of the position of the mirror and thus of the respective distance.

In another embodiment of the invention there is provided a per se known device for reflecting into the image field the distance corresponding to the position of the partly transparent mirror. Moreover, it is advantageous to arrange the partly permeable or transeparent mirror of the telemeter eyepiece so as to be swingable into, and out of, the course of the rays.

In this case, it is important to combine the device for swinging the partly permeable mirror with a device for opening and closing the window openings or apertures in the casing of the telescope.

In telescopes with variable distance of the eyepieces it is advantageous to provide a compensating device which allows for the actual interocular distance by providing a base adapted to this distance.

The indexing of the two optical systems about their common pivot for setting the telescope to the distance between the pupils of the actual user may preferably serve as a drive for the compensation device, using a control curve embodying the ratio between the distance of the optical system and the corresponding base.

In a particularly simple and advantageous embodiment of the invention a toothed wheel provided in the center axis of the telescope is fixedly connected with one half of the casing for meshing with a toothed segment mounted on the other half of the casing and having a segment lever supporting or guiding a curve by means of which the position of the mirror is corrected according to the actual length of the basis.

Especially distance meters or range finders of the rotating wedge type or of the swing wedge type may be used for realizing the invention.

Another modification of the invention is fitted with an optical system which projects, e. g. reflects, a sector of the image produced in one half of the telescope as an object of measurement into the same image plane and in the same magnification, but with a different focal distance and a different brightness, into the other half of the telescope, an optical system for comparison of the two images being provided for compensating the difference of the focal distance of the two images and the drive of said optical system being provided with a scale for indicating the actual distance adjusted in the telescope.

In an arrangement of this kind the optical system advantageously consists of two members disposed in the course of the reflected rays, said parts having equal but opposite focal distance in such a way that the image is produced between them in the infinite.

One of these members may advantageously be a highly divergent member while the second one, spaced at a finite distance therefrom, is a slightly converging member.

An optical element arranged in the course of the reflected rays passing from one half of the telescope into the other half may be used to change the focal length of the first mentioned half of the telescope.

Advantageously, the optical element consists of a movable lens adapted to be inserted into, and removed from, the course of the rays of the respective half of the telescope.

Moreover, it is advantageous to provide in the course of the reflected rays a highly divergent lens and a condenser lens in such a way that the focal distance of the system consisting of the shiftable lens and the highly divergent lens is oppositely equal to the focal distance of the converging lens and that the image is produced in the infinite in the space in front of said condenser lens.

Advantageously, for changing the focal distance of one half of the telescope there is provided an optical element which is disposed in the course of the reflected rays leading from this half of the telescope into the other half thereof.

Advantageously, three deflection wedges may serve as measuring wedges, two of these wedges forming a pair of rotating wedges while the third wedge is fixedly arranged.

In order to prevent substantial losses of light caused by the use of partly permeable mirrors it is preferred to arrange in front of each of the two eyepieces a stationary plane parallel glass plate having in its center a mirror surface which is preferably of rectangular shape and of a size of about 3 x 2 mms. In order to attain a sufficient contrast effect between the two images of the two halves of the telescope and to facilitate operation of the telescope, it is advantageous to provide an additional element for changing the brightness of one of the two halves of the telescope, and preferably of the second half thereof, said additional element preferably being adapted to be put out.

Preferably a slip-on diaphragm adapted to be put on an objective sleeve or socket or stub and advantageously a rotatable perforated disc changing the amount of incident light is used for this purpose.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a central section through a binocular telescope having the invention applied thereto, Fig. 2 is a side view, partly in section, showing the drive for a swingable partly permeable mirror serving for range finding, Fig. 3 is a plan view, partly in section, showing the same drive, Fig. 4 is a detail, partly in section, showing a device for compensating different distances between the pupils of several users, Fig. 5 is a front view showing an adjustable or setting device for a rotating wedge telemeter or range finder, Fig. 6 is an axial section thereof, Fig. 7 is a similar section, but showing a modified form, Fig. 8 is a front view similar to Fig. 5, but showing a modification, Fig. 9 is an axial section thereof, Fig. 10 is an axial section showing a modified form thereof, Fig. 11 is an axial section showing a still further modified form, Fig. 12 is a front view of a still further embodiment, Fig. 13 is a central section of a modified form of a telescope having the invention applied thereto, Similar reference numerals denote similar parts in the different views.

Referring now to the drawings in greater detail and first to Fig. 1, it will be seen that a picture is transmitted to the telemeter eyepiece of a binocular telescope through the appertaining objective 2 and a prism system 3 and through a partly permeable mirror 4 which is inserted in the course of the rays between the prism system 3 and the telemeter eyepiece 1. The mirror 4 is mounted for rotation or swinging movement in one of the casings 5 of the telescope. The second image passes through the other objective 6 of the telescope and an appertaining prism system 7 to the second eyepiece 8. A part of this image ray is transmitted through the semi-reflecting boundary surface 9 of the prism system 7 and a reflecting prism 10 put on the same and through a rotating mirror 4 also to the telemeter eyepiece 1. For transmitting this part of the image ray from the reflecting prism 10 to the mirror 4, a small window 11 is provided in each of the telescope casings 5, in mutually opposed positions.

The two images are brought to coincidence in the telemeter eyepiece 1 by rotation or swinging of the mirror 4 about its axis 12 (Fig. 2) by means of a curve 13, each position of the mirror corresponding to a definite distance of the user from a target.

This distance can be either indicated directly on a setting member 14, Fig. 2, for the mirror 4 on a scale 15, through window 16, Fig. 3, or reflected into the image field.

For range finding the mirror 4 may be swung into, and out of, the course of the rays of the telemeter eyepiece. To this end a lever 17, Figs. 2 and 3, is provided, which engages the mirror 4 from below and is swingable about a pivot 18 mounted in the casing 5 of the telescope. The swinging of the lever 17 is effected by moving a driving lever 19 mounted on the pivot 18 and freely projecting to the outside through a slot in the casing 5. Preferably the lever 19 is provided with a knurled edge at its free margin. By movement of the lever 19 the mirror 4 is swung upwards about its pivot 12 through the pivot 18 and the lever 17 and thus moved out of the course of the rays. During this motion the windows 11 can be opened and closed accordingly by a diaphragm 20 mounted on the pivot 18, so as to avoid light losses or disturbing side light.

Fig. 4 shows a device for compensating different distances between the eyes of various users, allowing for the actual ocular distance by associating thereto a corresponding base. The device consists of a toothed wheel 21 disposed in the center axis of the telescope and being fixedly connected with one half 5 of the casing, said toothed wheel meshing with a toothed segment 22 mounted in the other half of the casing 5. Hence, by a swinging movement of the two halves of the casing 5 about their common center axis for adaptation to the ocular distance of the user, this segment 22 changes its position. A segment lever 23 of the segment 22 supports a curve 24 by means of which the position of the mirror 4 can be corrected according to the actual length of the base.

Several embodiments of a setting device for rotating wedge telemeters are shown in Figs. 5 to 12.

The two sleeves or sockets 25 and 26, Figs. 5 and 6, for the oppositely moved wedges of a rotating wedge telemeter are pot-shaped, socket 25 of one of the wedges having a larger diameter than that of the other wedge and being formed with flanged borders 27 or 28 facing each other. Frictional rollers 29 mounted on journals 30 of a stationary part 31 of the casing project into the annular gap between these borders.

When turning the outer socket 25, this movement is transmitted to the other socket 26 in an opposite direction by frictional rollers 29, whereby the wedges are readjusted.

According to Fig. 7 the inner surface of the flanged border 27 and the outer surface of the flanged border 28 are toothed, pinions 32 being provided instead of frictional rollers and engaging in the toothed portion of the two flanged borders 27 and 28, respectively.

In the embodiment of Figs. 8 and 9, the two sleeves or sockets 25 and 26 are of equal diameter and formed each with a toothing 33. A mitre pinion 34 mounted on a stationary part of the casing 5 meshes simultaneously with the two toothed portions so that on rotation of one of the sockets the other one is also moved, in an opposite direction.

In the modification shown in Fig. 10 the two sockets 25 and 26 are provided with mitre type toothed rims 35 facing each other and meshing with pinions 36 for transmission of the movement.

Fig. 11 shows a similar arrangement with bevel wheels 37.

In the embodiment of Fig. 12 each of the two sockets 25 and 26 is formed with a driving pin 38 or 39, these pins projecting into slots 40 of a member 41 by the sliding of which, in the direction of the arrows, as indicated, the sockets are rotated in opposite direction, as indicated by the dotted arrows.

A telescope fitted with a rotating wedge telemeter is shown in Fig. 13 in which the left-hand eyepiece 8 is constructed as a telemeter eyepiece, the optical system being adjusted to the maximum distance between the objectives and the image produced in the right-hand half of the telescope being reflected into the left-hand half in such a way that the image produced in the right-hand half becomes visible in the left-hand eyepiece in the form of a brighter sector, in the same image plane and with the same magnification as the normal image produced in the left-hand half.

Inserted in the right-hand half of the telescope, between the objective 2 and the upper prism 3 is a shifting lens 42 which is swingable about a pivot 43 and adapted to be inserted into the course of the reflected rays of the telescope if it is intended to measure the distance by a lever 44, and to be removed from the course of the rays for use of the two halves of the telescope as a normal binocular telescope. This shifting lens serves to change the focal distance of the course of the reflected rays with respect to the length of the course of the rays in the left-hand half of the telescope during the measuring or range-finding operation. Arranged between the prism 45 and the eyepiece 1 is a partly transparent stationary mirror 46, 47 consisting of an inclined plane parallel non-silvered glass plate 40 having in its center a small mirrored area 47 of about 3 x 2 mms. size only. A similarly constructed mirror 48 is disposed in the other half of the telescope. Consequently only a small part of the image area appears as the object of measurement in the left-hand eyepiece 8. In this way, losses of light are avoided, compared to the completely mirrored reflection surfaces hitherto used.

Arranged in the wall of the casing belonging to the ocular 1 is a planoconcave lens 49 through which the image coming from the mirror 46 is transmitted. The light rays are then transmitted, through a pair of rotating wedges 54, 55 arranged above the pivot 50 of the telescope and adapted to be driven from a hand wheel 51 by means of bevel wheels 52 and 53, through a third stationary wedge 56 and through a biconvex lens 57, to the second mirror 48 arranged in the left-hand half of the telescope.

The shifting lens 42, the planoconcave lens 49, the pair of rotating wedges 54, 55, the stationary wedge 56 and the biconvex lens 57 coact for compensating the difference in the focal distance of the two halves of the telescope.

The wheel 51 serving for moving the rotating wedges 54, 55 is provided with a scale 58 on which the measured distance can be read.

Since normally both, the image reflected into the left-hand half of the telescope and the image reflected into the right-hand half thereof have nearly the same brightness, it is required, in order to attain a sufficient contrast between the two images, to darken one of the images. To this end a slip-on diaphragm 59 is put on the left-hand objective tube, said diaphragm having a rotatable disc 60 with holes 61 of different diameters.

It will be understood that this mechanical darkening device can also be replaced by suitable optical means.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. In an optical observation instrument having a pair of eyepieces, a pair of tubular body portions, and a pair of telescope optical lens systems each mounted within a corresponding tubular body portion to each form a normal image, in a corresponding eyepiece, of a distant object with two light beams received through separate, individual apertures provided on the tubular portions, a range finder comprising, means to selectively direct a portion of the beam of light passing through one optical lens system to the other eyepiece cooperative with the other lens system and for directing said portion of the beam in the form of a sector of the image, in the same image plane with the same magnification as the normal image viewable in the other eyepiece cooperative with said other lens system and including means to selectively change the focal distance of said one optical system relative the other lens system during the time said sector of an image is viewable in said other eyepiece, a third optical system for compensating for said change of focal distance thereby to bring the sector image viewable in said other eyepiece into focus with the image normally viewable in said other eyepiece, and means associated with said third optical system for indicating the range to the object as a function of the compensation necessary to bring the images into focus.

2. In an optical observation instrument according to claim 1, in which said means for directing the light beam in the form of a sector of the image comprises a pair of cooperating mirrors each having a light reflecting and directing area substantially less than half of the area each of the mirrors.

3. In an optical observation instrument according to claim 1, in which the means for compensating for said change of the focal distance between said lens systems comprises a lens movable in and out of the image-forming light beam directed to said one lens system through its associated aperture in the tubular body portion in which it is mounted.

4. In an optical observation instrument according to claim 1, in which said means to direct a portion of the beam of light passing through said one lens system comprises a first mirror having a reflecting surface less than one half of the area of the mirror, a second mirror similar to the first mirror for reflecting the portion of the beam to the eyepiece associated with the other lens system.

5. In an optical observation instrument according to claim 1, in which said means to direct a portion of the beam of light passing through said one optical system comprises a pair of light transparent mirrors each cooperative with a respective lens system of said pair of optical lens systems to form a normal image in the respective eyepieces and each having a light-reflecting centrally disposed area corresponding with their optical axes, said light-reflecting areas being rectangular in shape of about 3 x 2 millimeters, said light-reflecting areas cooperating in directing said portion of the beam in the form of a sector of the image to the eyepiece associated with said other optical lens system.

6. In an optical observation instrument according to claim 1, including means to render said sector of the image brighter than the image viewable in said other eyepiece, thereby to render focusing and range determination easier and more accurate.

7. In an optical observation instrument according to claim 1, in which said means to render said sector brighter comprises a removable diaphragm cooperative with the tubular body portion and the aperture of the other eyepiece receptive of said light beam portion which comprises said sector of the image.

8. In an optical observation instrument according to claim 7, in which said diaphragm comprises a rotatable disc provided with a plurality of apertures.

References Cited in the file of this patent

UNITED STATES PATENTS

| | | |
|---|---|---|
| 920,756 | Konig | May 4, 1909 |
| 934,841 | Royall | Sept. 21, 1909 |
| 2,106,632 | Freund | Jan. 25, 1938 |
| 2,336,330 | Wittel | Jan. 25, 1938 |
| 2,262,100 | French | Nov. 11, 1941 |
| 2,284,049 | French | May 26, 1942 |

FOREIGN PATENTS

| | | |
|---|---|---|
| 221,115 | Germany | Apr. 20, 1910 |
| 11,734 | Great Britain | of 1915 |